(12) United States Patent
Sakai et al.

(10) Patent No.: US 6,994,767 B2
(45) Date of Patent: Feb. 7, 2006

(54) METHOD AND APPARATUS FOR ADHERING FRICTION MATERIAL TO CORE PLATE FOR LOCKUP CLUTCH

(75) Inventors: Kazuo Sakai, Shizuoka-ken (JP); Masayuki Takagi, Fujisawa (JP)

(73) Assignee: NSK-Warner K.K., Tokyo (JP)

(*) Notice: Subject to any disclaimer, the term of this patent is extended or adjusted under 35 U.S.C. 154(b) by 269 days.

(21) Appl. No.: 10/365,420

(22) Filed: Feb. 13, 2003

(65) Prior Publication Data
US 2003/0168163 A1   Sep. 11, 2003

(30) Foreign Application Priority Data
Mar. 6, 2002   (JP)   .............................. 2002-059983

(51) Int. Cl.
*B32B 31/12*   (2006.01)
*B32B 31/20*   (2006.01)

(52) U.S. Cl. ................. 156/279; 156/245; 156/583.91; 264/113; 264/125; 264/259

(58) Field of Classification Search ............... 156/245, 156/279, 580, 583.91
See application file for complete search history.

(56) References Cited

U.S. PATENT DOCUMENTS 1,626,403 A * 4/1927 Gatke .......................... 188/259
5,093,057 A * 3/1992 Hara et al. ................... 264/112

FOREIGN PATENT DOCUMENTS

JP   UM 58-24306   2/1983

* cited by examiner

*Primary Examiner*—Sam Chuan Yao
(74) *Attorney, Agent, or Firm*—Miles & Stockbridge P.C.

(57) ABSTRACT

A method for adhering a friction material for a lockup clutch, with which a friction material is adhered to a flat surface of a core plate, comprises a disposing step of disposing the friction material between a heated member and the flat surface of the core plate, a pressing/heating step of bringing the heated member into contact with the core plate and applying load to the core plate by a plurality of pins from a back side opposite to the flat surface of the core plate, and a step of maintaining a state under the above-mentioned pressing/heating step for a predetermined time.

1 Claim, 4 Drawing Sheets

METHOD AND APPARATUS FOR ADHERING FRICTION MATERIAL TO CORE PLATE FOR LOCKUP CLUTCH

BACKGROUND OF THE INVENTION

1. Field of the Invention

The present invention relates to a method and apparatus for adhering a friction material to a core plate of a lockup clutch that is used for an automatic transmission of a vehicle or the like.

2. Related Background Art

FIGS. 4, 5A and 5B show a conventional method and apparatus for adhering a friction material to a core plate of a lockup clutch. An adhering apparatus 101 has a jig 102 for positioning a core plate 120 and a friction material 121 that has been formed into an annular shape by blanking and a pressing jig 103 that is so disposed as to be opposed to the jig 102. The pressing jig 103 is adapted to be lowered from above to press the core plate 120 and the friction material 121. The jig 102 and the pressing jig 103 are maintained to high temperatures by heaters 105 and 106 respectively.

The friction material 121 is applied with adhesive made of a thermosetting resin that has been dried and cured. When the core plate 120 and the friction material 121 are heated and pressed by the adhering apparatus 101, the adhesive is once softened and then cured completely to attain adhesion.

However, the above-described adhering method and apparatus suffers from a problem as follows. The core plate is formed into a prescribed shape by blanking and drawing, and, in some cases, it is further processed by heat. However, a slight deformation sometimes remains in the core plate after those formation processes. In order to eliminate the deformation, cutting is performed on the side surface of the core plate to which a friction material is to be adhered, so that required precision in size is attained. On the other hand, it is economically preferable to omit cutting of the side surface opposite to the side surface to which the friction material is adhered, since such precision in size is not required for the opposite side surface from the viewpoint of the product performance.

However, if the adhering is performed on the core plate having such a residual deformation by the above described method and apparatus, as shown in FIG. 5A, the deformation on the opposite surface 123 of the core plate 120 affects the adhesion surface 122, as the core plate is pressed by the pressing jig 103. In spite that under the pressed state, the deformation is absorbed by elastic deformation of the friction material 121, after the completion of the adhesion, a deformation will occur in the friction material. This deformation will cause a judder, when the lockup clutch is caused to slip in an automatic transmission.

SUMMARY OF THE INVENTION

The invention is intended to solve the above-described problem and has an object to adhere a friction material evenly to a core plate to maintain its performance without a need for eliminating a residual deformation in the surface opposite to the adhesion surface of the core plate, so that a judder would be prevented from occurring.

According to the present invention there is provided a method for adhering a friction material for a lockup clutch, with which a friction material is adhered to a flat surface of a core plate, comprising:

a disposing step of disposing the friction material between a heated member and the flat surface of said core plate;

a pressing/heating step of bringing said heated member into contact with the core plate and applying load to the core plate by a plurality of pins from a back side opposite to the flat surface of the core plate; and a step of maintaining the state under said pressing/heating step for a predetermined time.

According to the present invention, there is also provided an adhering apparatus for a lockup clutch, which adheres a friction material to a flat surface of a core plate, comprising:

a positioning member that performs positioning of the friction material and the core plate;

a first heater that heats the positioning member;

a plurality of pins that is so disposed to be opposed to the positioning member and supported by springs;

a holding member that holds the pins and the springs;

a contacting member to be in contact with a back surface of the core plate opposite to the flat surface;

a second heater that heats the contacting member; and a pressing mechanism that applies load to the friction material and the core plate.

According to one aspect of the invention, the above-described apparatus is provided with a heat insulator intervening between the second heater and the holding member.

In the present invention, the pressing mechanism that applies load to the friction material and the core plate may be, for example, a hydraulic cylinder or a ball screw etc.

The friction material having an annular shape is placed on the positioning member, and then the core plate is placed thereon in such a way that its adhesion surface is facing to the friction material. Next, the core plate is heated via the positioning member and the contacting member, under the state in which the back surface opposite to the adhesion surface of the core plate is pressed by the pins that are supported by the springs. In connection with this, the adhesion surface of the core plate has been machined by cutting to have a required precision in size.

BRIEF DESCRIPTION OF THE DRAWINGS

FIG. 5A shows a state in which an adhering surface of a core plate is affected by a deformation in the opposite surface by pressing, while FIG. 5B shows a state in which a deformation is occurring in a friction material after completion of adhesion.

DETAILED DESCRIPTION OF THE PREFERRED EMBODIMENTS

Figure 1:
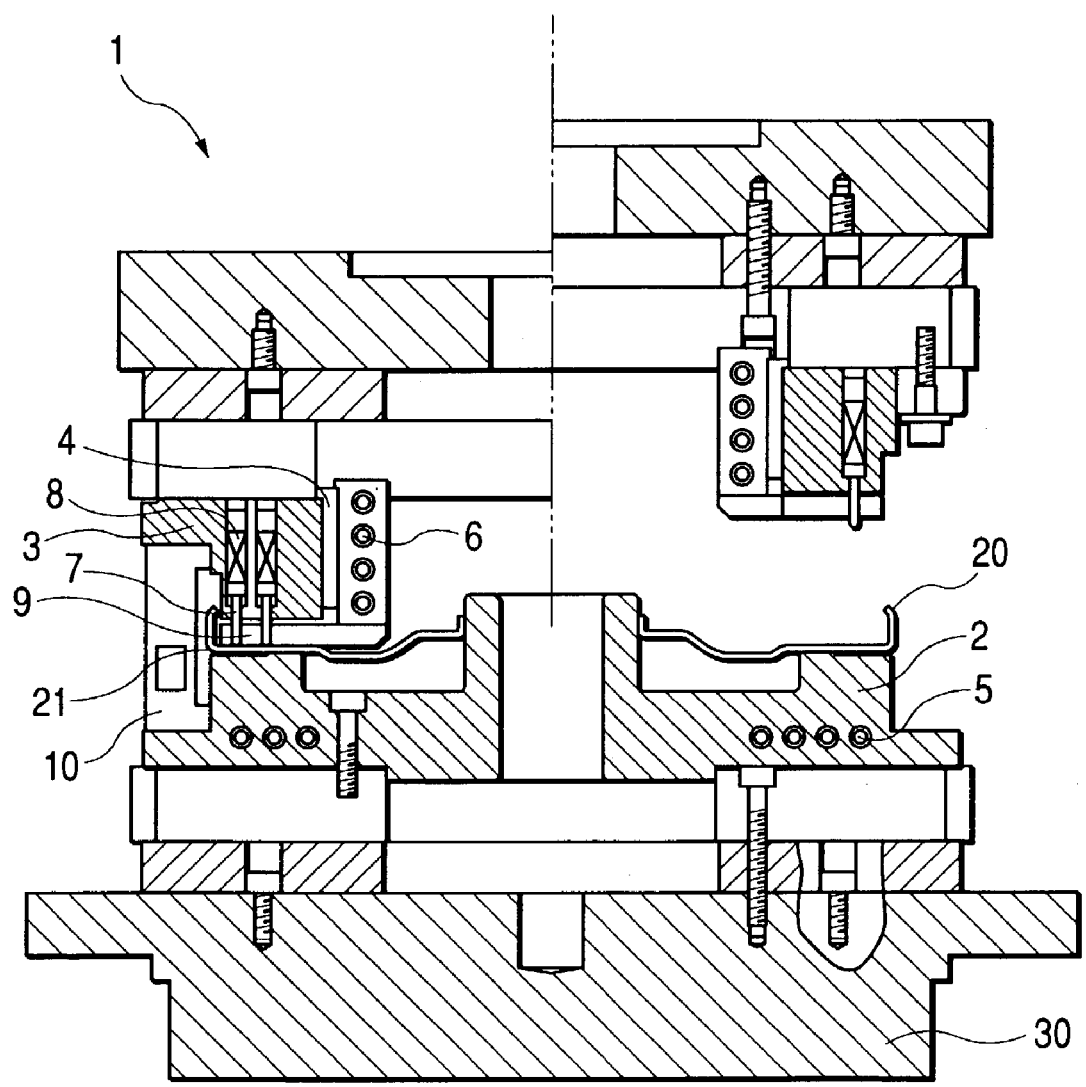
FIG. 1 is an axial cross-sectional view of an adhering apparatus according to an embodiment of the present invention.

In the following, an embodiment of the present invention will be specifically described with reference to the annexed drawings. In the drawings, the same parts are designated with the same reference numerals.

FIG. 1 is an axial cross-sectional view showing an adhering apparatus 1 as an embodiment of the present invention. In FIG. 1, the left half shows a state under the adhering operation, and the right half shows a stand-by state. The adhering apparatus 1 is provided with an annular positioning member 2 fixed on a base 30 for positioning a friction material 21 and a core plate 20, a first heater 5 provided in the interior of the positioning member 2, a plurality of pins 7 that are so disposed as to be opposed to the positioning member 2 and supported by springs 8, and an annular holding member 3 for holding the pins 7 and the springs 8.

The adhering apparatus 1 is further provided with a contacting member 9 to be in contact with the back surface of the core plate 20 opposite to the flat (or even) surface, a second heater 6 for heating the contacting member 9, and a pressing mechanism (not shown) for applying load to the friction material 21 and the core plate 20. The pressing mechanism may be, for example, a hydraulic cylinder or a ball screw etc.

The apparatus is provided with a heat insulator 4 intervening, in the radial direction, between the holding member 3 and the second heater 6. The heat insulator 4 is provided for preventing thermal degradation of the springs 8. Stoppers 10 are provided in the vicinity of the outer periphery between the positioning member 2 and the holding member 3 to restrict the relative movement of those members with respect to the axial direction. The stoppers 10 restrict the amount of the movement in the axial direction, of the positioning member 2 and the holding member 3 in order to prevent a collapse of the friction material 21 that can occur if an excessive pressure is exerted on the friction material. Furthermore, the contacting member 9 is attached to the holding member 3 at the axial edge thereof with play in the vertical direction.

Figure 2:
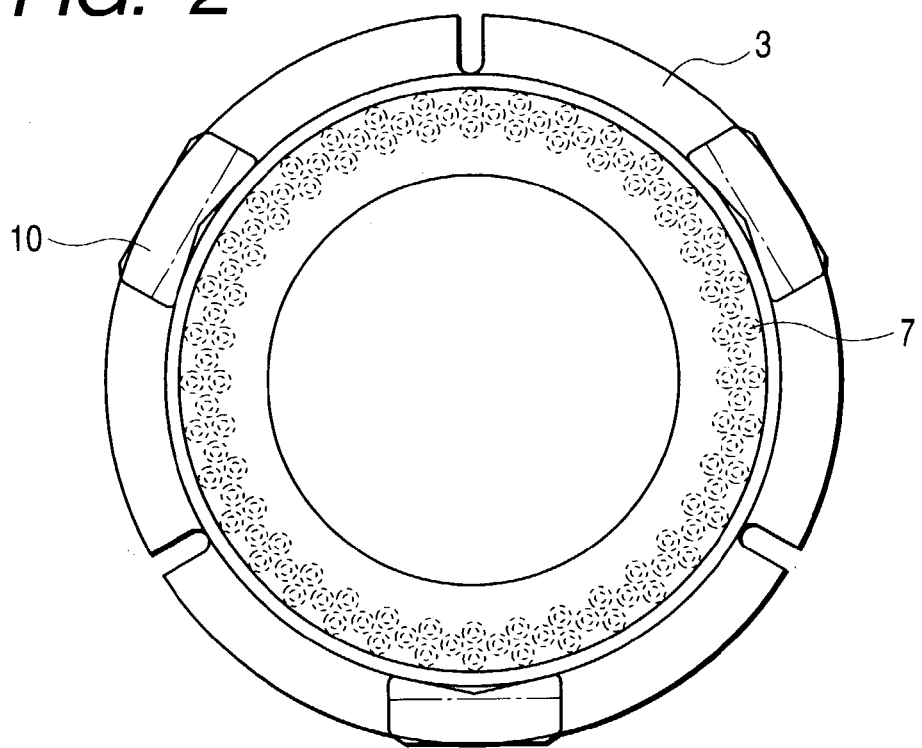
FIG. 2 is a bottom view of a holding member used in the embodiment of the present invention.

FIG. 2 is a bottom view of the holding member 3 used in the embodiment of the invention. There is provided three stoppers 10 at the outer peripheral portion with equal circumferential spaces. The pins 7 are disposed all over the area that substantially conforms to an adhesion surface 22 (see FIG. 3). Insufficiency in the number of the pins 7 is undesirable, since a large pressure will be partially exerted. In order to prevent unevenness in pressing, it is preferable that the pins 7 be arranged in such a way that the distances between the pins are equal to each other.

Figure 3:
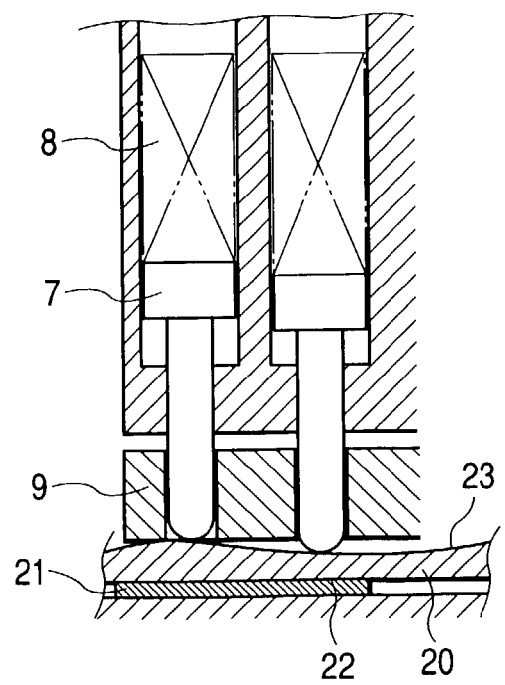
FIG. 3 is an enlarged partial view showing a state of adhesion in the embodiment of the present invention.
Figure 4:
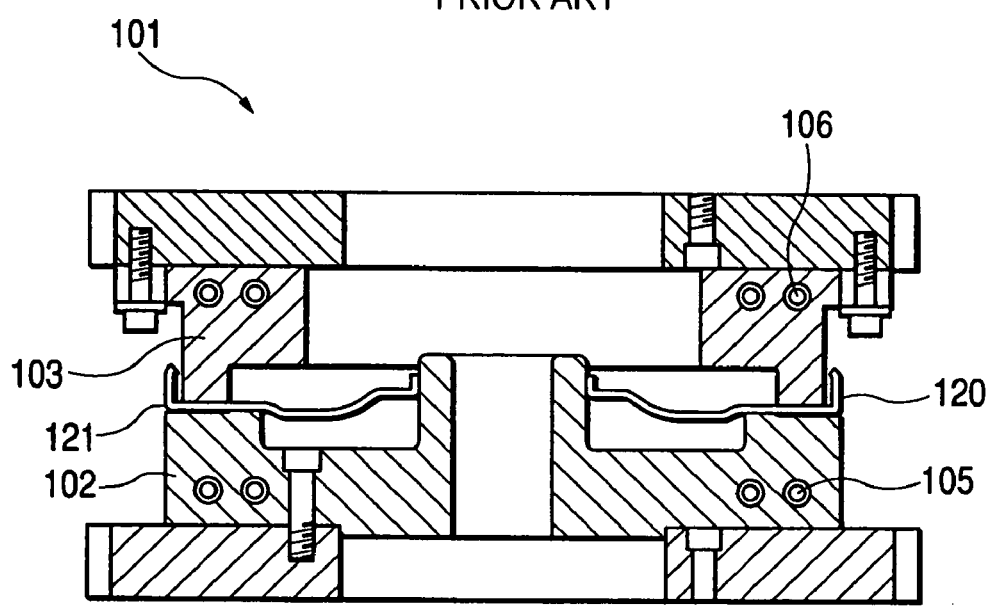
FIG. 4 is a cross-sectional view showing a conventional adhering apparatus.
Figure 5A:
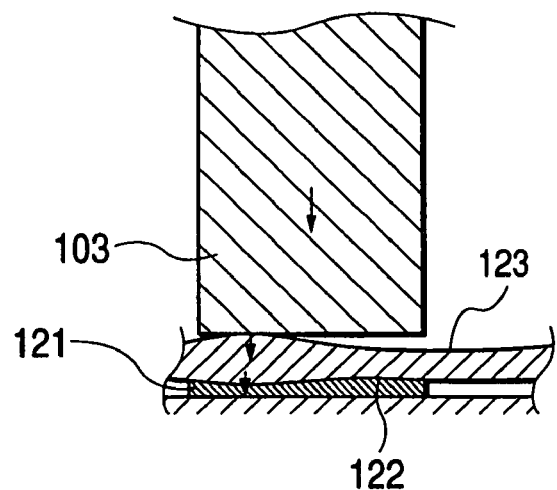
FIGS. 5A and 5B are enlarged partial views showing states of adhesion in the conventional apparatus.
Figure 5B:
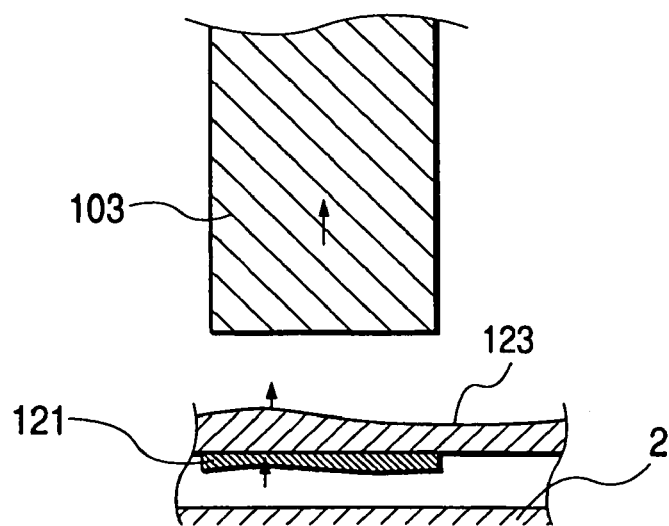

FIG. 3 is an enlarged partial view showing a state in which the adhesion surface 22 of the core plate to which the friction material 21 is adhered is pressed by the pins 7. In FIG. 3, there is illustrated a deformation remaining on the back surface 23 of the core plate 20, namely the degree of flatness of the back surface 23 is low.

In FIG. 3, the deformation is illustrated in an exaggerated manner in order to help understanding of the situation. As shown in FIG. 3, when the back surface 23 is pressed by the pins 7, concave portions of the back surface are also pressed. Therefore, the degree of unevenness in pressing over the portion substantially conforming to the adhesion surface 22 can be reduced. In connection with this, since the contacting member 9 is attached to the holding member 3 with play that allows a vertical movement of the contacting member 9, it can relieve the load from a hydraulic cylinder (not shown).

In other words, the contacting member 9 is adapted to apply to the core plate 9 only a load equal to its own weight.

With the adhering apparatus according to the present invention as described above, a method according to the present invention for adhering a friction material to a core plate is performed as follows. Firstly, the friction material 21 is placed between the positioning member 2 that is heated by the heater 5 and the core plate 20. Specifically, the friction material 21 and the core plate 20 are placed on the positioning member 2 in such a way that the surface of the friction material on which adhesive has been applied and cured is facing to the adhesion surface 22 of the core plate 20.

Next, load is applied to the core plate 20 from the backside opposite to the flat surface of the core plate 9, and the heated positioning member is brought into contact with the core plate 9, so that the core plate 9 is pressed and heated. Specifically, the holding member 3 disposed above the core plate 20, which is holding the contacting member 9 heated by the second heater 6 and the pins 7 supported by the springs 8 is lowered by a hydraulic cylinder (not shown), so that the contacting member 9 is brought into contact with the core plate 20. Under this state, the core plate 20 is heated and the back surface 23 of the core plate 20 is pressed by the pins 7 that are supported by the springs 8.

This state is maintained for a predetermined time, and then the contacting member 9 and the holding member 3 are detached from the core plate 20. Thus, the adhesion is completed, and finally, the friction material is fixedly attached to the friction surface of the core plate.

It should be noted that the adhesion surface of the core plate has been machined into a flat (or even) surface by cutting. The adhesive used in the present invention may be, for example, a phenolic thermosetting adhesive etc.

With the present invention, an embodiment of which has been described above, a friction material can be adhered to a core plate flatly without a need for eliminating a deformation remaining on the surface opposite to the adhesion surface. Therefore, it is possible to assure performance of a lockup clutch that uses the core plate with a judder being prevented from occurring.

What is claimed is:

1. A method for adhering a friction material for a lockup clutch, with which a friction material is adhered to a flat surface of a core plate, comprising:
   a disposing step of disposing the friction material between a heated member and the flat surface of said core plate;
   a pressing/heating step of bringing said heated member into contact with said core plate and pressing a plurality of pins against a back surface of the core plate to apply a load to the core plate, said back surface being opposite said flat surface of the core plate; and
   a step of maintaining a state under said pressing/heating step for a predetermined time.

* * * * *